(12) United States Patent
Brumley et al.

(10) Patent No.: US 7,984,311 B2
(45) Date of Patent: Jul. 19, 2011

(54) DEMAND BASED POWER ALLOCATION

(75) Inventors: Alan Brumley, Cedar Park, TX (US);
Michael Brundridge, Georgetown, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 525 days.

(21) Appl. No.: 12/188,502

(22) Filed: Aug. 8, 2008

(65) Prior Publication Data
US 2010/0037070 A1  Feb. 11, 2010

(51) Int. Cl.
*G06F 1/00* (2006.01)
*G06F 1/32* (2006.01)

(52) U.S. Cl. ........ 713/300; 713/310; 713/320; 713/321; 713/322; 713/323; 713/324; 713/330; 713/340; 700/295

(58) Field of Classification Search ............... 713/300, 713/310, 320–324, 330, 340; 700/295
See application file for complete search history.

(56) References Cited

U.S. PATENT DOCUMENTS

| | | | | |
|---|---|---|---|---|
| 7,702,931 B2 * | 4/2010 | Goodrum et al. | ............ | 713/300 |
| 7,739,548 B2 * | 6/2010 | Goodrum et al. | ............ | 714/20 |
| 7,757,107 B2 * | 7/2010 | Goodrum et al. | ............ | 713/320 |
| 2008/0222435 A1 * | 9/2008 | Bolan et al. | ............ | 713/310 |
| 2009/0193276 A1 * | 7/2009 | Shetty et al. | ............ | 713/340 |

OTHER PUBLICATIONS

Sudhir Shetty and Ashish Munjal; System and Method for Dynamic Information Handling System Prioritization; Jul. 13, 2007; U.S. Appl. No. 11/777,528.
Sudhir Shetty and Ashish Munjal; System and Method for Dynamic Utilization-Based Power Allocation in a Modular Information Handling System; Jan. 24, 2008; U.S. Appl. No. 12/018,853.
Ashish Munjal and Arun Muthaiyan; System and Method for Managing Blades After a Power Supply Unit Failure; Jun. 9, 2008; U.S. Appl. No. 12/135,320.
Michael J. Roberts and Ashish Munjal; System and Method for Managing Power Supply Units; Jun. 9, 2008; U.S. Appl. No. 12/135,323.
Michael Brundridge, Alan Brumley and Ashish Munjal; System and Method for Smoothing Power Reclamation of Blade Servers; Jun. 20, 2008; U.S. Appl. No. 12/143,522.

* cited by examiner

*Primary Examiner* — Abdelmoniem Elamin
(74) *Attorney, Agent, or Firm* — Haynes and Boone, LLP

(57) ABSTRACT

A demand based power re-allocation system includes one or more subsystems to assign a power allocation level to a plurality of servers, wherein the power allocation level is assigned by priority of the server. The system may throttle power for one or more of the plurality of servers approaching the power allocation level, wherein throttling includes limiting performance of a processor, and track server power throttling for the plurality of servers. The method compares power throttling for a first server with power throttling for remaining servers in the plurality of servers and adjusts throttling of the plurality of servers, wherein throttled servers receive excess power from unthrottled servers.

17 Claims, 6 Drawing Sheets

DEMAND BASED POWER ALLOCATION

CROSS REFERENCE TO RELATED APPLICATIONS

The present application is related to U.S. Utility Application Ser. No. 12/135,320, filed on Jun. 9, 2008, still pending, U.S. Utility Application Ser. No. 12/135,323, filed on Jun. 9, 2008, still pending, and U.S. Utility Application Ser. No. 12/143,522, filed on Jun. 20, 2008, still pending, the disclosures of which are assigned to the assignee of record in the present application and incorporated herein by reference in their entirety.

BACKGROUND

The present disclosure relates generally to information handling systems, and more particularly to a demand based power allocation for multiple information handling systems.

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

A server IHS is generally understood as an IHS dedicated to running a server application. A server application is a program or a set of instructions that accepts network connections to service requests from other IHSs by sending back responses to the requesting IHSs. Examples of server applications include mail servers, file servers, proxy servers, and others. A server is simply an IHS that provides services or resources to other IHSs.

Blade servers are generally understood as self-contained IHS servers provided for high density computing using a minimum of extra components. While a standard rack-mount server IHS may include with (at least) a power cord and network cable, blade servers may have many components removed for space, power and other considerations, while still having the functional components to be considered an IHS. A blade enclosure to hold multiple blade servers may provide services such as, power, cooling, networking, interconnects and management. Together the blade servers and the blade enclosure form the blade system.

A problem with server systems is that electrical power may be withheld/throttled from one server and provided to another server, causing the throttled server to be forced to run below maximum performance. As such, there is no server power re-balancing mechanism in server chassis post power allocation to blades such as for blade servers. A subset of blades may end up continuously getting throttled (i.e., continue to run at much lower performance) while another subset of blades may have a surplus (based on current load).

Accordingly, it would be desirable to provide an improved demand based power allocation/reallocation absent the disadvantages discussed above.

SUMMARY

According to one embodiment, a demand based power re-allocation system includes one or more subsystems to assign a power allocation level to a plurality of servers, wherein the power allocation level is assigned by priority of the server. The system may throttle power for one or more of the plurality of servers approaching the power allocation level, wherein throttling includes limiting performance of a processor, and track server power throttling for the plurality of servers. The system compares power throttling for a first server with power throttling for remaining servers in the plurality of servers and adjusts throttling of the plurality of servers, wherein throttled servers receive excess power from unthrottled servers.

DETAILED DESCRIPTION

For purposes of this disclosure, an IHS 100 includes any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS 100 may be a personal computer, a network storage device, or any other suitable device and may vary in size, shape, performance, functionality, and price. The IHS 100 may include random access memory (RAM), one or more processing resources such as a central processing unit (CPU) or hardware or software control logic, read only memory (ROM), and/or other types of nonvolatile memory. Additional components of the IHS 100 may include one or more disk drives, one or more network ports for communicating with external devices as well as various input and output (I/O) devices, such as a keyboard, a mouse, and a video display. The IHS 100 may also include one or more buses operable to transmit communications between the various hardware components.

Figure 1:
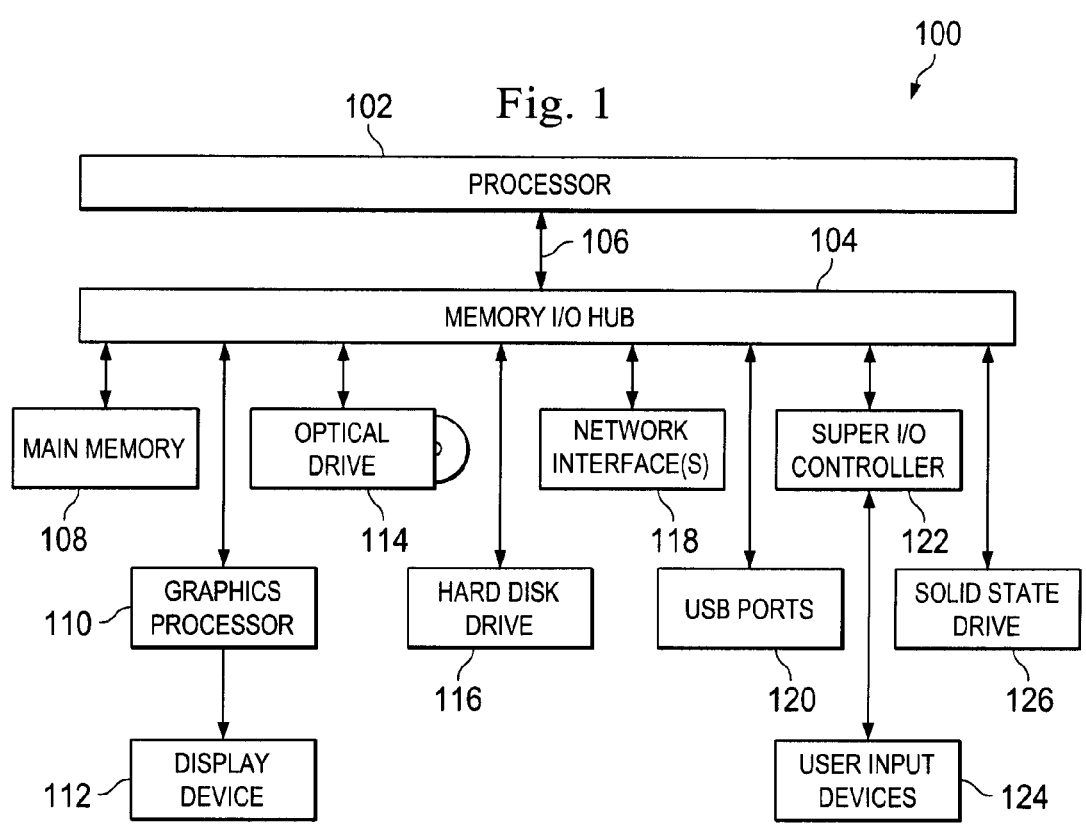
FIG. 1 illustrates an embodiment of an information handling system (IHS).

FIG. 1 is a block diagram of one IHS 100. The IHS 100 includes a processor 102 such as an Intel Pentium™ series processor or any other processor available. A memory I/O hub chipset 104 (comprising one or more integrated circuits) connects to processor 102 over a front-side bus 106. Memory I/O hub 104 provides the processor 102 with access to a variety of resources. Main memory 108 connects to memory I/O hub 104 over a memory or data bus. A graphics processor 110 also connects to memory I/O hub 104, allowing the graphics processor to communicate, e.g., with processor 102 and main memory 108. Graphics processor 110, in turn, provides display signals to a display device 112.

Other resources can also be coupled to the system through the memory I/O hub 104 using a data bus, including an optical drive 114 or other removable-media drive, one or more hard disk drives 116, one or more network interfaces 118, one or more Universal Serial Bus (USB) ports 120, and a super I/O controller 122 to provide access to user input devices 124, etc. The IHS 100 may also include a solid state drive (SSDs) 126 in place of, or in addition to main memory 108, the optical drive 114, and/or a hard disk drive 116. It is understood that any or all of the drive devices 114, 116, and 126 may be located locally with the IHS 100, located remotely from the IHS 100, and/or they may be virtual with respect to the IHS 100.

Not all IHSs 100 include each of the components shown in FIG. 1, and other components not shown may exist. Furthermore, some components shown as separate may exist in an integrated package or be integrated in a common integrated circuit with other components, for example, the processor 102 and the memory I/O hub 104 can be combined together. As can be appreciated, many systems are expandable, and include or can include a variety of components, including redundant or parallel resources.

The present disclosure relates to a system to perform server power re-balancing in a set of a plurality of servers such as, a server chassis 130 including a plurality of blade servers. It should be readily understood by a person having ordinary skill in the art that a server may be substantially similar to the IHS 100. However, the term server, blade or blade server may be used interchangeably throughout this application instead of IHS 100 for simplicity. An embodiment of the present disclosure may limit some servers in the set from being continuously run at lower performance levels while other servers in the set that are at the same power priority level, never fully utilize power allocated to that server. In this light, the present disclosure describes a mechanism to perform incremental and continuous server power reallocations from servers not using all allocated power to servers needing more power. In an embodiment, the power reallocation may be performed by tracking length and frequency of periods that servers are in a throttled power state.

Servers may be throttled during a run-time using current monitor chipsets embedded in the server. Servers in a server chassis 130 may automatically perform a server throttle and unthrottle as the server's measured power consumption reaches a server's internal warning threshold which may be set by the chassis management controller (CMC). A CMC is a controller for controlling operations for a server rack/chassis 130. In an embodiment, a server management controller, such as, a remote access controller (RAC) sends a CMC notification to the CMC as the server enters and exits power throttle states. These notifications may be provided to allow the CMC to be aware of the server's status for informational purposes.

Figure 2:
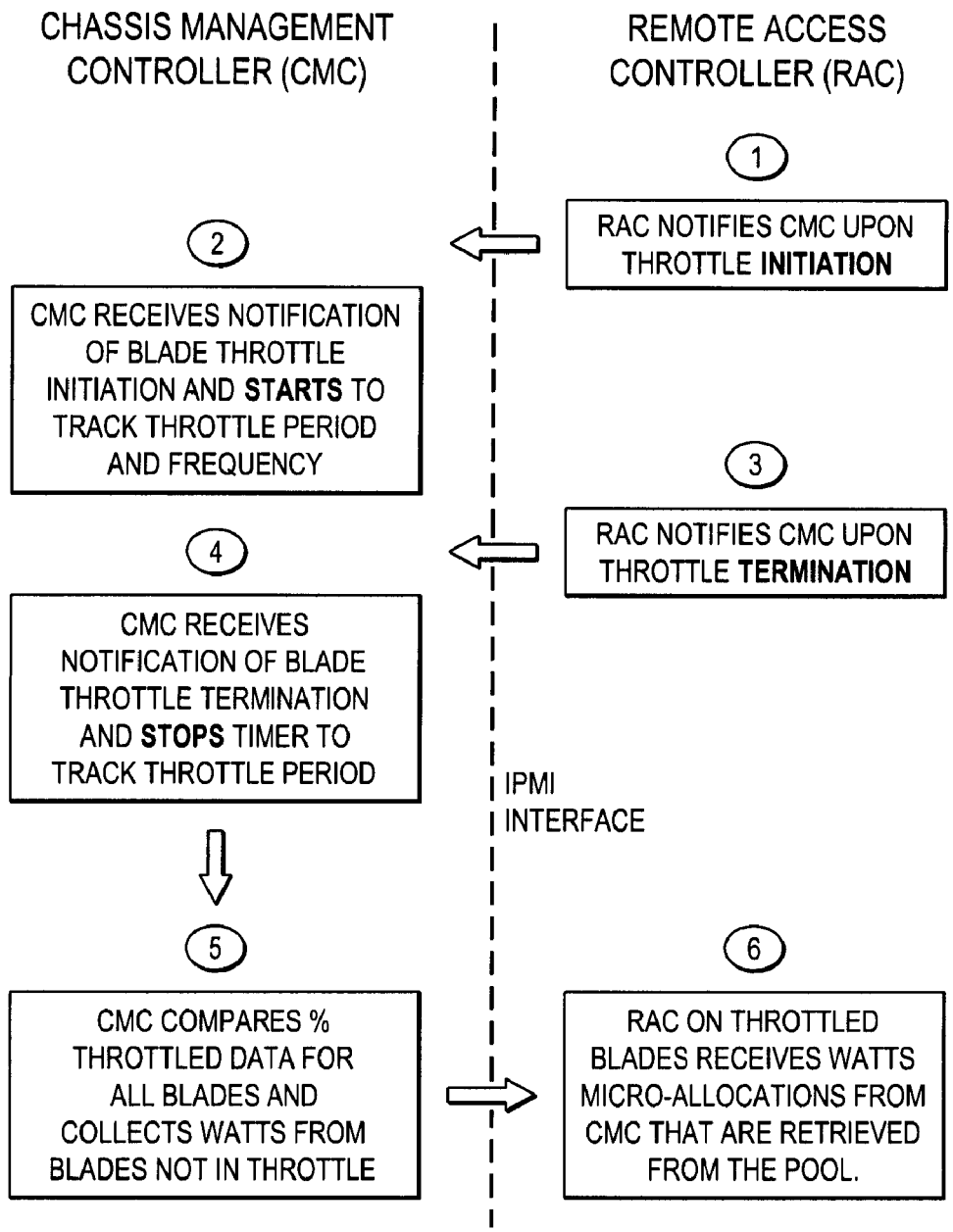
FIG. 2 illustrates an embodiment of a method for throttling/unthrottling servers and related communication between a chassis management controller and a remote access controller.

FIG. 2 illustrates an embodiment of a method for throttling/unthrottling servers and related communication between a CMC and a RAC. The RAC sends reports of server events to the CMC upon actions such as, server throttle initiation action at block 1. The server throttle initiation action may be performed by a server's current monitor. In an embodiment, communication between the RAC and the CMC may be facilitated using an intelligent platform management interface (IPMI). However, other specifications may be used for this communication. The CMC receives the notification of a blade throttle initiation from the RAC and starts a timer to track throttle period and frequency at block 2. The RAC sends reports again upon server throttle termination action at block 3. Similarly, the server throttle termination action may be performed by the server's current monitor. The CMC receives the notification of a blade throttle termination from the RAC and stops the timer to track throttle period and frequency at block 4. The CMC runs a rolling sampling window to track the server throttle/unthrottle events for each of a plurality of servers in a server chassis 130 (e.g., the blade servers in a blade server rack). The CMC may then use the throttle and unthrottle event information to track how long each blade was throttled during this window, frequency of throttling/unthrottling for each server, amount of excess power available (watts) and a variety of other data. This throttling information (e.g., percent of throttling time vs. unthrottling time) is compared against the information for all servers in the chassis 130 at block 5. Servers that were not throttled may contribute power (wattage) to an excess power/wattage pool 132. Servers that have been throttled may be provided or otherwise allowed to use an allocation of power (wattage) from the pool 132. For example, at block 6, the RAC on throttled servers receive micro-allocations (e.g., watts) from the CMC that are retrieved from the wattage pool 132.

A power priority setting as well as a percentage of time throttled in relation to the other server may be used to factor in how much a server contributes or withdraws from the excess power pool 132. In an embodiment, the CMC constantly calculates these reallocations/micro-reallocations while the server chassis 130 is in the "on" state. Over time, the heavily throttled servers end throttling as their power consumption level falls below the server's predetermined current monitor threshold based on allocated power for each server. In an embodiment, instructions power allocation may be contained within CMC firmware, within RAC firmware, or within other media.

The demand based power allocation may also allow lower priority servers to receive full power allocations if the higher priority servers become idle for a predetermined period of time. When the higher priority servers become loaded, they may quickly recover their rightful power allocations in the chassis 130, such as with instructions from the CMC and/or the RAC.

Figure 3:
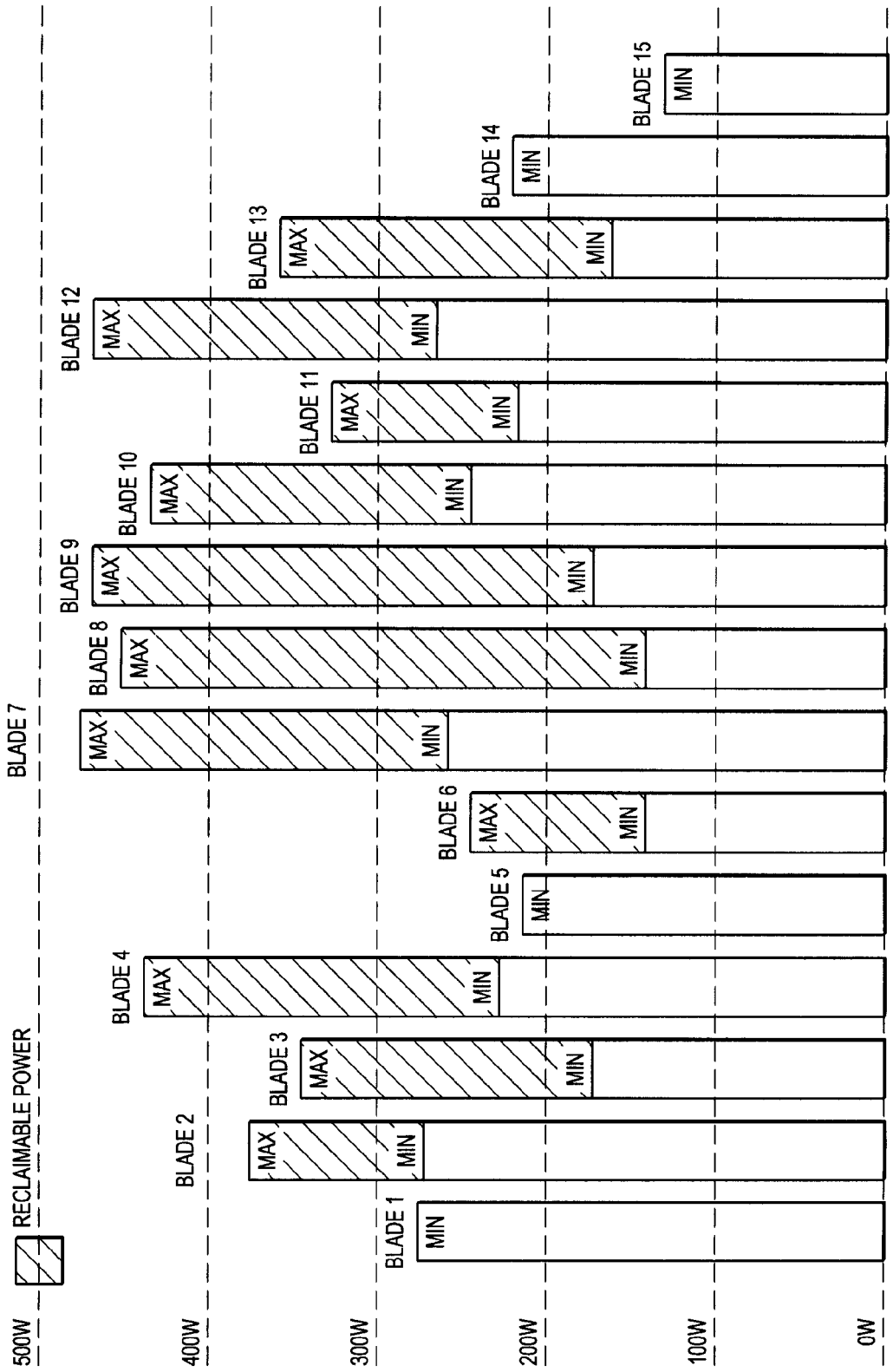
FIG. 3 illustrates an embodiment of a server power allocation and reclaimable power.

FIGS. 3-6 illustrate an embodiment of the method of FIG. 2 using blade servers. The server/blade numbers, percentages priorities, chassis 130 slots, and the like are provided only for example. Other information may be used in the method of FIG. 2. FIG. 3 illustrates an embodiment of a server power allocation and reclaimable power. As such, FIG. 3 illustrates an example of blade power allocation where Blades 1, 5, 14 and 15 are allocated a minimum amount of power and therefore end up with heavy throttling. Reclaimable power (shown in cross-hatch) is the amount of power that may be reclaimed from the blades. Note that Blades 1, 5, 14 and 15 have no Reclaimable power (e.g., these blades were allocated the minimum power that was needed).

Figure 4:
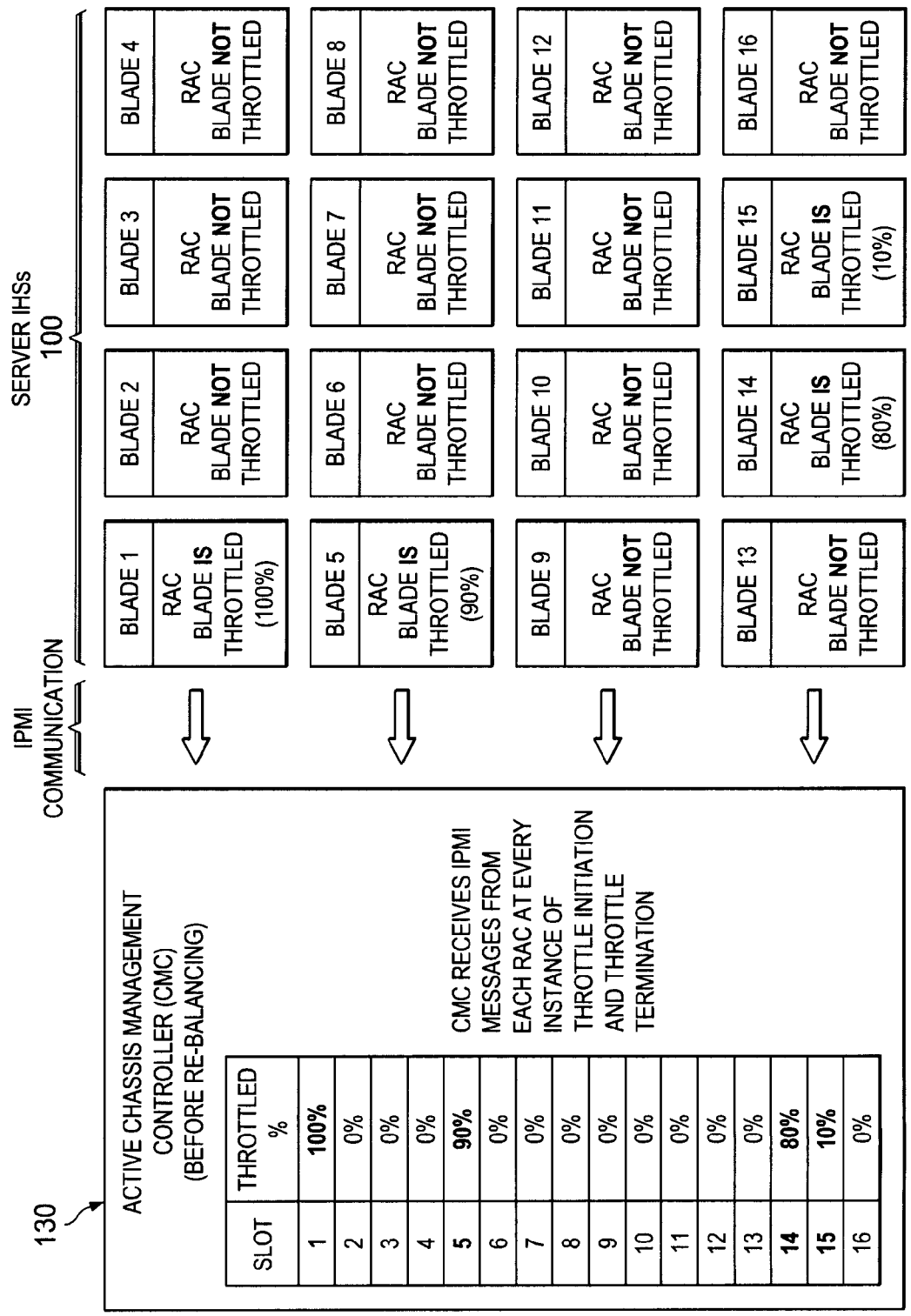
FIG. 4 illustrates an embodiment of an active chassis management controller and server throttle profile data before power re-balancing.

FIG. 4 illustrates an embodiment of an active chassis management controller and server throttle profile data before power re-balancing. FIG. 4 also illustrates an active CMC tracking heavily throttled blades by tracking throttle and unthrottle event messages as they are received from respective blades RAC. The active CMC identifies Blades 1, 5, 14 and 15 as heavily throttled blades based on throttle period and frequency. In an embodiment, both the number of watts and frequency of the window may be adjusted indirectly by a user/administrator of the blades. In other words, the user/ administrator may specify how aggressive the reallocation method will behave. This reallocation specification request may be used by the method of FIG. 2 behind the scenes by altering the sample window as well as the number of watts taken/given to a server. For the sake of discussion, numbers such as 1 watt or 5 minutes are used. However, the actual values may be chosen after analysis and user/administrator feedback for "more aggressive" or "less aggressive" reallocation behavior.

Figure 5:
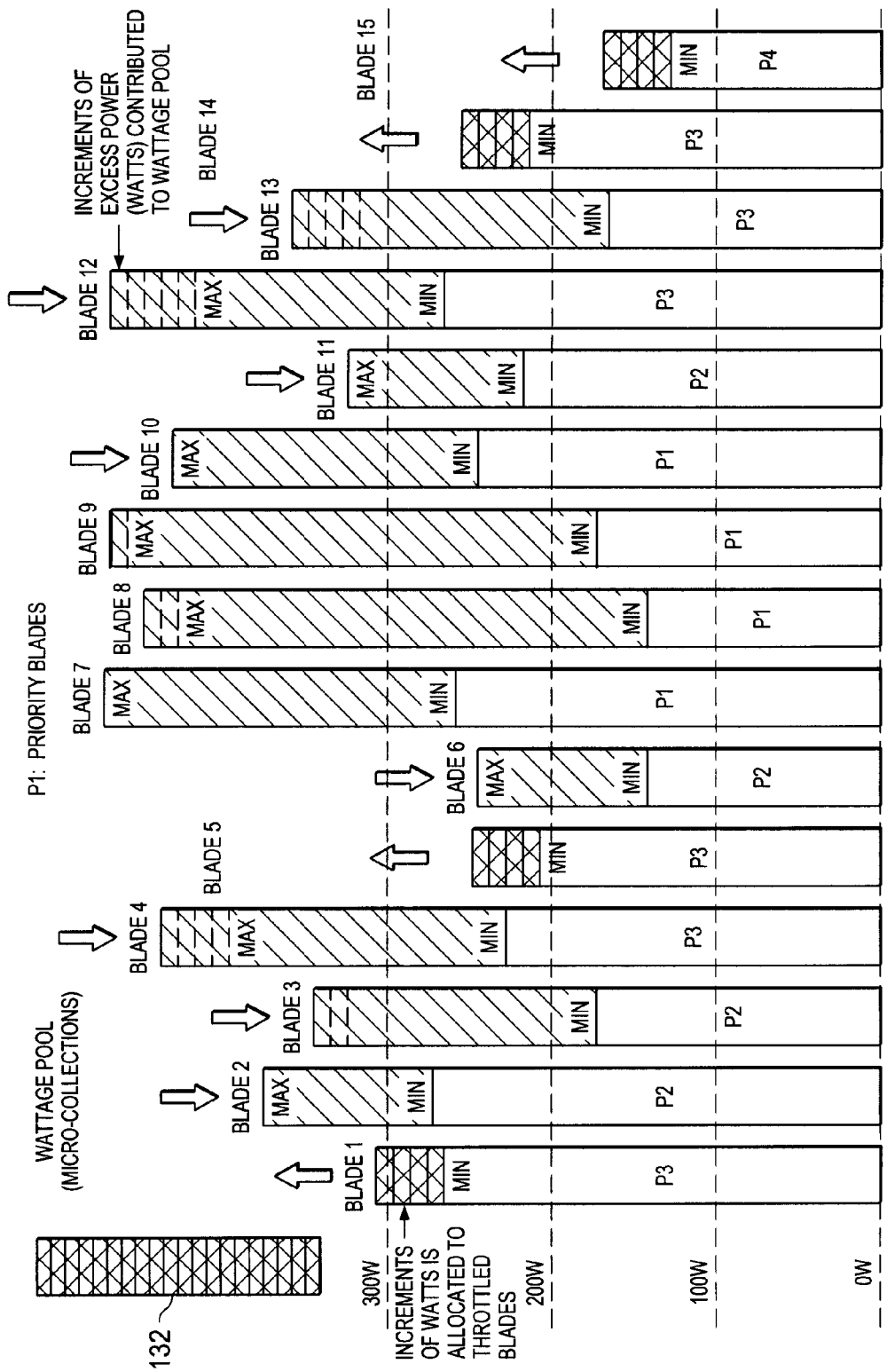
FIG. 5 illustrates an embodiment of a server power re-balancing and wattage pool.

FIG. 5 illustrates an embodiment of a server power re-balancing and wattage pool 132 where the method of FIG. 2 is used for Blade power re-balancing. Values such as, watts, priority, etc. are used for illustration and any values may be used in the present system. Excess power from the wattage pool 132 may be incrementally allocated to throttled blades by reclaiming power from unthrottled blades. Block arrows pointing upwards indicate the incremental value (e.g., W watts) increase units of time while block arrows pointing downwards indicate the incremental value (e.g., W watts) being reclaimed by the CMC or RAC on unthrottled blades to perform blade power re-balancing. The variable W may be assigned any value and may be user configurable.

Figure 6:
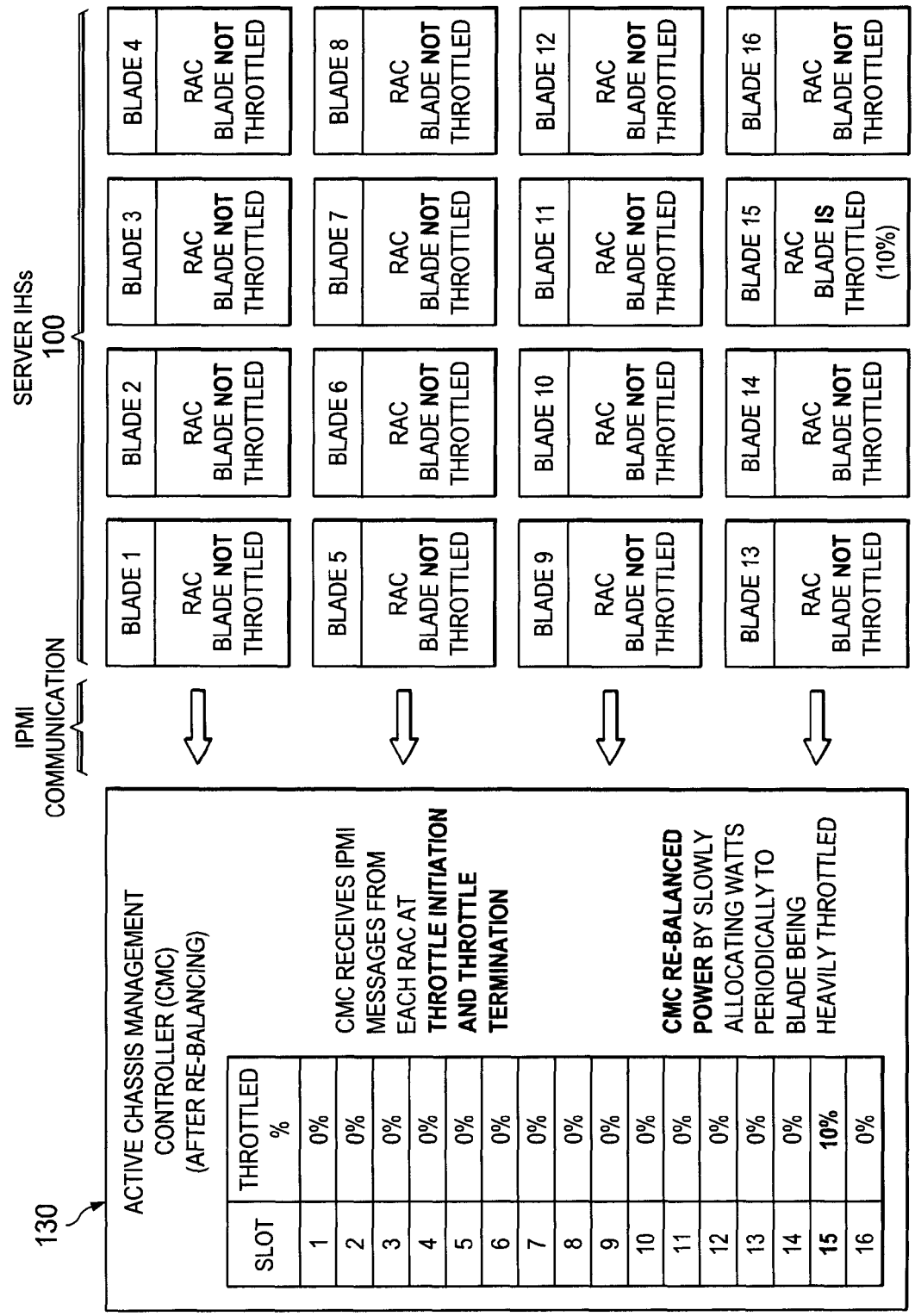
FIG. 6 illustrates an embodiment of a server throttle profile after power re-balancing.

FIG. 6 illustrates an embodiment of a server throttle profile after power re-balancing. Thus, FIG. 4 demonstrates an effect of blade power re-balancing where the excess power available from the wattage pool 132 is re-allocated to the blades in most need of power (e.g., blade 1 P3, blade 5 P3, and blade 14 P3. After re-allocation, only blade 15 (lowest priority of P4) remains throttled. However, if the wattage pool 132 had enough excess power available, blade 15 may have also been provided extra power and therefore eliminate the need for throttling blade 15.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A demand based power re-allocation system comprising one or more subsystems to:
   assign a power allocation level to a plurality of servers, wherein the power allocation level is assigned by priority of the server;
   throttle power for one or more of the plurality of servers approaching the power allocation level, wherein throttling includes limiting performance of a processor;
   track server power throttling for the plurality of servers;
   compare power throttling for a first server with power throttling for remaining servers in the plurality of servers;
   adjust throttling of the plurality of servers, wherein throttled servers receive excess power from unthrottled servers; and
   wherein tracking server power throttling includes tracking length and frequency of periods that the servers are throttled.

2. The system of claim 1, wherein the plurality of servers includes one or more blade servers.

3. The system of claim 1, wherein tracking server power throttling for the plurality of servers is communicated between a remote access controller and a chassis management controller.

4. The system of claim 1, wherein adjusting throttling of the plurality of servers occurs periodically.

5. The system of claim 1, wherein throttling power for one or more of the plurality of servers relates to the priority and to a percent of power throttled for a throttled server.

6. The system of claim 1, wherein lower priority servers of the plurality of servers receive power allocations from higher priority servers of the plurality of servers if the higher priority servers become idle for a predetermined period of time, and wherein the higher priority servers recover their power allocations from the lower priority servers when the higher priority servers become loaded.

7. An information handling system (IHS) configured as a server, the IHS comprising:
   a processor;
   a memory coupled with the processor; and
   a demand based power re-allocation system to run on the IHS, the demand based power re-allocation system comprising one or more subsystems to:
      assign a power allocation level to a plurality of servers, wherein the power allocation level is assigned by priority of the server;
      throttle power for one or more of the plurality of servers approaching the power allocation level;
      track server power throttling for the plurality of servers;
      compare power throttling for a first server with power throttling for remaining servers in the plurality of servers;
      adjust throttling of the plurality of servers, wherein throttled servers receive excess power from unthrottled servers; and
      wherein tracking server power throttling includes tracking length and frequency of periods that the servers are throttled.

8. The IHS of claim 7, wherein the plurality of servers includes one or more blade servers.

9. The IHS of claim 7, wherein tracking server power throttling for the plurality of servers is communicated between a remote access controller and a chassis management controller.

10. The IHS of claim 7, wherein adjusting throttling of the plurality of servers occurs periodically.

11. The IHS of claim 7, wherein throttling power for one or more of the plurality of servers relates to the priority and to a percent of power throttled for a throttled server.

12. The IHS of claim 7, wherein lower priority servers of the plurality of servers receive power allocations from higher priority servers of the plurality of servers if the higher priority servers become idle for a predetermined period of time, and wherein the higher priority servers recover their power allocations from the lower priority servers when the higher priority servers become loaded.

13. A method for demand based power re-allocation comprising:
   assigning a power allocation level to a plurality of servers, wherein the power allocation level is assigned by priority of the server;
   throttling power for one or more of the plurality of servers approaching the power allocation level, wherein throttling includes limiting performance of a processor;
   tracking server power throttling for the plurality of servers;
   comparing power throttling for a first server with power throttling for remaining servers in the plurality of servers;
   adjusting throttling of the plurality of servers, wherein throttled servers receive excess power from unthrottled servers; and wherein tracking server power throttling includes tracking length and frequency of periods that the servers are throttled.

14. The method of claim 13, wherein the plurality of servers includes one or more blade servers.

15. The method of claim 13, wherein tracking server power throttling for the plurality of servers is communicated between a remote access controller and a chassis management controller.

16. The method of claim 13, wherein adjusting throttling of the plurality of servers occurs periodically.

17. The method of claim 13, wherein throttling power for one or more of the plurality of servers relates to the priority and to a percent of power throttled for a throttled server, and wherein lower priority servers of the plurality of servers receive power allocations from higher priority servers of the plurality of servers if the higher priority servers become idle for a predetermined period of time, and wherein the higher priority servers recover their power allocations from the lower priority servers when the higher priority servers become loaded.

* * * * *